R. Norris.

Exhaust Nozzle for Steam Engine.

No. 3,465. Reissued May 25, 1869.

Witnesses:
V. C. Clayton
J. G. Clayton

Inventor:
R. Norris
by his atty J. C. Clayton

N. PETERS, PHOTO-LITHOGRAPHER, WASHINGTON, D. C.

United States Patent Office.

JOHN SANDERS, OF HARRISBURG, PENNSYLVANIA, ADMINISTRATOR OF THE ESTATE OF RICHARD NORRIS, DECEASED.

*Letters Patent No.* 84,370, *dated November* 24, 1868; *reissue No.* 3,465, *dated May* 25, 1869.

IMPROVEMENT IN EXHAUST-NOZZLE FOR STEAM-ENGINES.

The Schedule referred to in these Letters Patent and making part of the same.

*To all whom it may concern:*

Be it known that I, JOHN SANDERS, of Harrisburg, in the State of Pennsylvania, am the administrator of the estate of RICHARD NORRIS, of Central Depot, in the State of Virginia, who was, during his lifetime, the original and first inventor of certain new and useful "Improvements in Exhaust-Nozzles for Steam-Engines;" and I do hereby declare that the following is a full, clear, and exact description thereof, reference being had to the accompanying drawings, and to the letters of reference marked thereon, in which—

The nature of this invention consists in the manner herein described of constructing, a spring-nozzle, so that by its operation, fuel can be greatly saved, and the flue of the engine preserved thereby.

To enable others skilled in the art to make and use this invention, I will proceed to describe its construction and operation.

Figure 1:
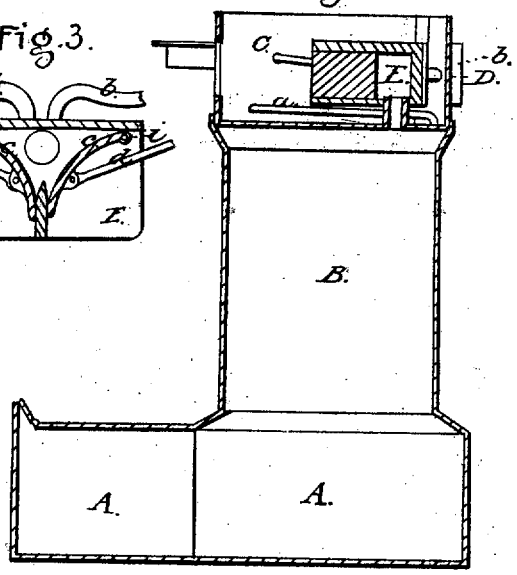
Figure 1 is a vertical section.

In the construction of this invention, in fig. 1,

A is the fire-box.

B, the boiler with flues.

C, the smoke-chamber.

D D, the cylinders.

E, the exhaust-nozzle.

*a a*, the steam-pipes, leading to cylinders.

*b b*, the exhaust-pipes, leading from the cylinders to the exhaust-nozzle *e*.

Figure 2:
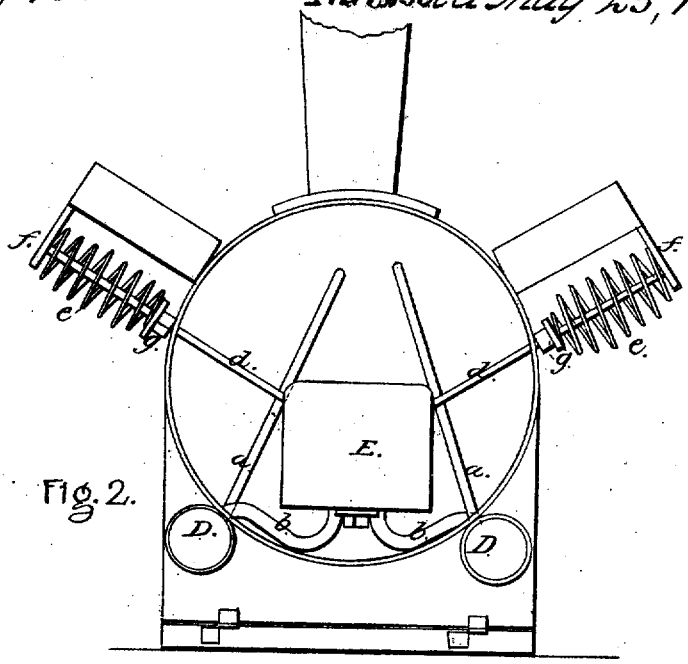
Figure 2 is a plan view.
Figure 3:
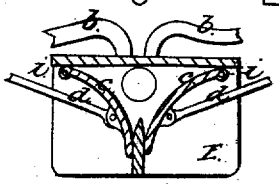
Figure 3 is a detached plan view, showing the valves of the nozzle.

*d d*, rods attached to the valves *c c*, in figs. 2 and 3.

*e e*, spring around said rods, and resting against screw-nuts on the rods *d d*, (said nuts are marked *g g*,) and also against frames *f f*, which frames are attached to the smoke-chamber C in any secure manner.

The nozzle is set in a guard or frame, composed of a top, bottom, and back.

The sides of the valves are hinged at *i i*, fig. 3, on the back side of the guard or frame, and form one of the sides of the valve.

The hinged sides of the valve fit snugly in the frame, and come to a point in front against partition *h*, fig. 3, and are of a triangular shape.

The top and bottom of the guard form the top and bottom of the valve. The exhaust-pipes enter this valve, as seen at *b b*, and bring the exhaust-steam into the valve or nozzle. When not operated on by the exhaust steam, they are held close against the partition by the spiral springs *e e* on the rods *d d*.

In the operation of this invention, having been constructed in the manner above described, the great amount of draught or current of air usually admitted to the fire-box is shut off, which, in ordinary locomotives, is necessary to cause the required draught, and which, by the great amount of oxygen thus admitted, causes very great and unnecessary heat, which will soon destroy the boiler, flues, and fire-box, by burning them out.

The aperture, in this improvement, for the admission of the air, is made much smaller than in ordinary locomotives, to prevent this great heat and destruction of the boiler, and by this exhaust-nozzle, using the exhaust steam, one is enabled to cause the required draught, with a small aperture for the admission of air.

The exhaus -steam is let into the nozzle from the cylinders by the exhaust-pipes *b b*, on alternate sides of the partition *h*, filling each side, alternately, of the valve or nozzle, as the exhaust steam enters the same. As the valves of the nozzle are alternately opened by the exhaust steam, they are immediately closed by the spiral spring *e e*, and the exhaust steam, having operated the valve or nozzle, passes off through the smoke-stack with the smoke, and escapes by this means.

Any amount of draught required is obtained without the usual enlarged opening in the fire-box, thus greatly saving the fire-box and flues, as the intensity of the heat is greatly decreased in them by means of this invention.

Having thus fully described this invention,

What is claimed as new, and desired to be secured by Letters Patent, is—

The arrangement of the valves *c c*, rods *d d*, springs *e e*, partition *h*, and exhaust-pipes *b b*, constructed as described.

In testimony that I claim the above-described invention as the invention of RICHARD NORRIS, for the benefit of his estate, I have hereunto signed my name, this 15th day of May, 1869.

JOHN SANDERS,
*Administrator of Richard Norris.*

Witnesses:

WASHINGTON BARR,
WM. D. EARNEST.